United States Patent [19]  [11] Patent Number: 5,033,513
Bartholomew  [45] Date of Patent: Jul. 23, 1991

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 360,387

[22] Filed: Jun. 2, 1989

Related U.S. Application Data

[60] Division of Ser. No. 251,038, Sep. 26, 1988, which is a continuation of Ser. No. 127,532, Dec. 2, 1987, which is a continuation of Ser. No. 748,307, Jun. 24, 1985, which is a division of Ser. No. 360,201, Mar. 22, 1982, which is a continuation-in-part of Ser. No. 201,711, Oct. 29, 1980.

[51] Int. Cl.$^5$ ............................................. F16L 37/12
[52] U.S. Cl. .................................. 138/109; 138/178; 285/319; 285/921
[58] Field of Search ...................... 138/109, 37, 40, 44, 138/103, 177, 178, DIG. 11; 285/319, 921

[56] References Cited

U.S. PATENT DOCUMENTS

| | | |
|---|---|---|
| 730,378 | 6/1903 | Lambert . |
| 921,691 | 5/1909 | Friday . |
| 1,542,421 | 6/1925 | Strongson . |
| 1,837,345 | 12/1931 | Thomas . |
| 1,976,589 | 10/1934 | Trickey . |
| 2,123,889 | 7/1938 | Gleason . |
| 2,441,344 | 5/1948 | Bosworth . |
| 2,585,887 | 2/1952 | Woodward . |
| 3,314,696 | 4/1967 | Ferguson et al. . |
| 3,450,424 | 6/1969 | Calisher . |
| 3,453,005 | 7/1969 | Foults . |
| 3,527,485 | 9/1970 | Goward et al. . |
| 3,534,988 | 10/1970 | Lindsey . |
| 3,538,940 | 11/1970 | Graham . |
| 3,569,903 | 3/1971 | Brishka . |
| 3,574,359 | 4/1971 | Klein . |
| 3,584,902 | 6/1971 | Vyse . |
| 3,628,768 | 12/1971 | Hutt . |
| 3,711,125 | 1/1973 | Dehar . |
| 3,718,350 | 2/1973 | Klein . |

(List continued on next page.)

FOREIGN PATENT DOCUMENTS

| | | |
|---|---|---|
| 163947 | 9/1949 | Australia . |
| 2360921 | 6/1974 | Fed. Rep. of Germany . |
| 2307154 | 8/1974 | Fed. Rep. of Germany . |
| 2611233 | 9/1977 | Fed. Rep. of Germany . |
| 2622269 | 11/1977 | Fed. Rep. of Germany . |
| 881439 | 7/1980 | U.S.S.R. . |
| 634848 | 3/1950 | United Kingdom . |
| 693094 | 6/1953 | United Kingdom . |
| 718350 | 11/1954 | United Kingdom . |
| 781554 | 8/1957 | United Kingdom . |
| 791247 | 2/1958 | United Kingdom . |
| 1030535 | 5/1966 | United Kingdom . |
| 1145667 | 3/1969 | United Kingdom . |
| 1172348 | 11/1969 | United Kingdom . |
| 1343665 | 1/1974 | United Kingdom . |
| 1350546 | 4/1974 | United Kingdom . |
| 2011002 | 7/1979 | United Kingdom . |
| 2014115 | 8/1979 | United Kingdom . |

OTHER PUBLICATIONS

See copending application Ser. No. 07/251,038, filed Sep. 26, 1988.

(List continued on next page.)

Primary Examiner—James E. Bryant, III
Attorney, Agent, or Firm—Harness, Dickey & Pierce

[57] ABSTRACT

A swivelable quick connect assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the housing bore.

4 Claims, 2 Drawing Sheets

U.S. PATENT DOCUMENTS

| | | |
|---|---|---|
| 3,724,882 | 4/1973 | Dehar . |
| 3,780,773 | 12/1973 | Haugen . |
| 3,826,523 | 7/1974 | Eschbaugh . |
| 3,929,356 | 12/1975 | DeVincent et al. . |
| 3,929,357 | 12/1975 | DeVincent et al. . |
| 3,933,378 | 1/1976 | Sandford et al. . |
| 3,980,324 | 9/1976 | Bouteille et al. . |
| 4,005,883 | 2/1977 | Guest . |
| 4,009,896 | 3/1977 | Brewer . |
| 4,080,752 | 3/1978 | Burge . |
| 4,114,464 | 9/1978 | Asano et al. . |
| 4,123,089 | 10/1978 | Viero et al. . |
| 4,123,091 | 10/1978 | Cosentino et al. . |
| 4,128,264 | 12/1978 | Oldford . |
| 4,135,745 | 1/1979 | Dehar . |
| 4,136,885 | 1/1979 | Uhrner . |
| 4,158,407 | 6/1979 | Rest . |
| 4,214,586 | 7/1980 | Mericle . |
| 4,219,222 | 8/1980 | Brusadin . |
| 4,244,608 | 1/1981 | Stuemky . |
| 4,266,814 | 5/1981 | Gallagher . |
| 4,483,371 | 11/1984 | Susin . |
| 4,483,543 | 11/1984 | Fisher, Jr. et al. . |
| 4,524,995 | 6/1985 | Bartholomew . |
| 4,601,497 | 7/1986 | Bartholomew . |
| 4,681,351 | 7/1987 | Bartholomew . |

OTHER PUBLICATIONS

See copending application Ser. No. 07/360,407, filed Jun. 2. 1989.

See copending application Ser. No. 07/360,405, filed Jun. 2, 1989.

See copending application Ser. No. 07/360,862, filed Jun. 2, 1989.

See copending application Ser. No. 07/360,548, filed Jun. 2, 1989.

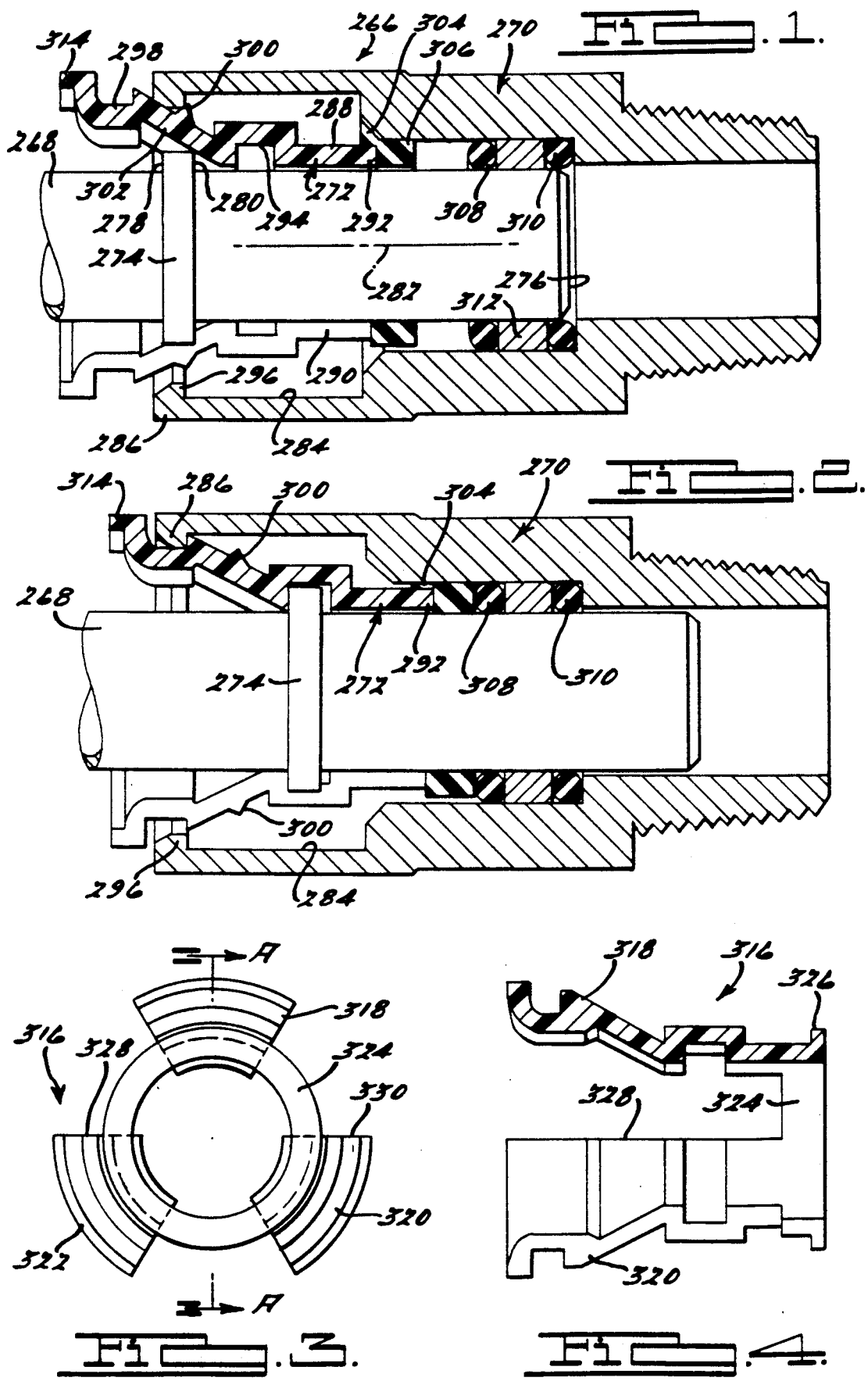

SWIVELABLE QUICK CONNECTOR ASSEMBLY

This is a division of U.S. patent application Ser. No. 251,038, filed Sept. 26, 1988 entitled "A SWIVELABLE QUICK CONNECTOR ASSEMBLY" which is a continuation application of Ser. No. 127,532, filed Dec. 2, 1987, which is a continuation application of Ser. No. 748,307, filed June 24, 1985, which is a divisional application of Ser. No. 360,201, filed Mar. 22, 1982, which is a continuation-in-part application of Ser. No. 201,711, filed Oct. 29, 1980, all having the same title as above.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

It is also an object of the present invention to provide an improved retainer element which operates to both secure the conduit in the axial bore of the housing and position the sealing element within the axial bore of the housing.

It is a more specific object of the present invention to provide an improved retainer element formed with three or more leg members which operate to detachably secure the retainer element to the housing, the sealing means within the housing, the conduit in its operative position within the axial bore of the housing, and provide better resistance to off axis forces on the conduit.

To achieve the foregoing objects, the present invention provides a swivelable connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means includes three or more circumferentially spaced resilient deformable leg members which extend from an integral collar member at one end thereof. Each of the leg members has an outwardly opening channel portion which is adapted to receive the inwardly extending lip of the housing to secure the retainer means to the housing, and an inwardly opening channel portion adapted to receive the annular projection of the conduit for securing the conduit in its operative position within the axial bore of the housing.

Additional objects and advantages of the present invention will become apparent from reading of the detailed description of the preferred embodients which makes reference to the following set of drwings in which:

BRIEF DESCRIPTION OF THE DRAWINGS

FIG. 1 is a side elevation view, partially in cross-section, of a connector assembly according to the present invention in a partially installed position.

FIG. 2 is a side elevation view, partially in cross-section, of the connector assembly illustrated in FIG. 1 with the tubular conduit shown in its operative position in the axial bore of the housing.

FIG. 4 is a side elevation view, partially in cross-section, of the retainer element illustrated in FIG. 3, taken along lines A—A.

FIG. 5 is a side elevation view, partially in cross-section of the tubular conduit illustrated in FIGS. 1 and 2.

Referring to FIG. 1, a side elevation view of a connector assembly 266 is shown, partially in cross-section, in a partially installed position. The connector assembly 266 includes a tubular conduit 268, a housing 270, and a retainer element 272. The conduit 268 is formed with an annular projection 274 disposed a predetermined lead distance from an end 276 of the conduit to be connected. It should be noted that the annular projection 274 is symmetrical in shape, in that the opposing surfaces 278 and 280 of the projection are generally transverse to a central axis 282 of the conduit 268 and generally parallel each other.

Figure 3:
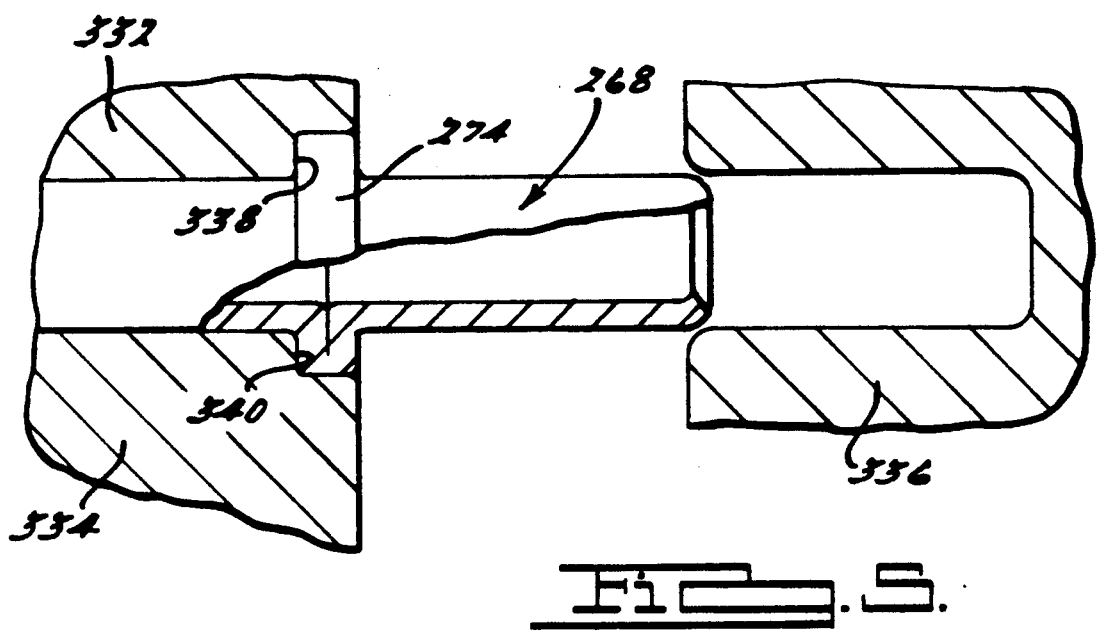
FIG. 3 is a front elevation view of an improved retainer element.

The retainer element 272 is adapted to be disposed generally within an axial bore 284 of the housing 270 and is detachably secured to the housing at a first end 286 of the housing. The retainer serves to secure the conduit 268 in its operative position within the axial bore 284 of the housing 270 by cooperating with the annular projection 274 of the conduit. The retainer element 272 includes three circumferentially spaced resilient, deformable leg members, of which only two leg members 288 and 290 are shown in FIG. 1. These leg members extend from an integral collar member 292 at one end of the retainer element 272. The collar member 292 is adapted to provide an opening sufficient to permit the end 276 of the conduit to pass therethrough. Each of the leg members is formed with an inwardly opening channel portion 294 which is adapted to receive the annular projection 274 of the conduit 268 for securing the conduit in its operative position within the axial bore 284 of the housing 270. The shape of the inwardly opening channel portion 294 of the leg members is generally complimentary to the shape of the annular projection 274 of the conduit. Although various suitable shapes may be provided for the inwardly opening channel portion 294 and the annular projection 274, the shapes should be such as to lock the conduit into the axial bore 284 of the housing and prevent or limit axial movement of the conduit relative to the housing. Each of the leg members are also formed with an outwardly opening channel portion 296 which is adapted to receive an inwardly extending annular lip 298 of the housing to secure the retainer element 272 to the housing. The shape of the outwardly opening channel portion 298 of the leg members and the annular lip 296 of the housing are subject to the same considerations noted above for the inwardly opening channel portion 294 of the leg members and the annular projection 274 of the conduit 268. However, it may also be noted that rather than forming the annular lip 296 of the housing 270 by casting or milling, the annular lip may also be formed by rolling in the first end 286 of the housing.

The leg members (288, 290) of the retainer element 272 are adapted to deform in response to the insertion of the retainer element into the axial bore 284 of the housing 270 and permit the annular lip 296 of the housing to snap into the outwardly opening channel portion of each of the leg members. Similarly, the leg members of the retainer element 272 are adapted to deform in response to the insertion of the conduit 268 into the axial bore 284 of the housing 270 and through the collar member 292 of the retainer element 272, and permit the annular projection 274 of the conduit to snap into the inwardly opening channel portion 294 of the leg members. However, one feature of the connector assembly 266 is that the annular projection 274 of the conduit is adapted to snap into the inwardly opening channel portion 294 of the leg members (288, 290) before the annular lip 296 of the housing 270 snaps into the outwardly opening channel portion 298 of the leg members. This feature will permit the annular projection 274 of the conduit to easily snap into the inwardly opening channel portion 294 of the leg members. This feature is achieved by providing for two sets of tabs which cooperate to maintain the retainer element 272 in the partially installed position shown in FIG. 1 until the annular projection 274 of the conduit 268 has snapped into the inwardly opening channel portion 294 of the retainer element leg members. The first set of tabs 300 extend outwardly along an inclined portion 302 of the retainer element leg members, and operate to prevent the retainer element 272 from falling out of the axial bore 284 of the housing 270. One or more first tabs 300 may be provided on each of the retainer element leg members as may be appropriate in the particular application. The second set of tabs 304 are formed to extend generally outwardly from a bushing 306 disposed within the axial bore 284 of the housing 270. The second tabs 304 are shaped such that they will resist the further insertion of the retainer element 272 into the axial bore 284 from the partially installed position until the annular projection 274 snaps into the inwardly opening channel portion 294 of the retainer element. However, once the conduit 268 is thus joined or united to the retainer element 272, the second tabs 304 will yield and deflect inwardly to permit the further insertion of the conduit 268 and the retainer element 272 into the axial bore 284 of the housing 270 until the annular lip 296 of the housing snaps into the outwardly opening channel portion 298 of each of the retainer element leg members and the conduit is in its operative position with the axial bore of the housing. FIG. 2 illustrates the connector assembly 266 with the conduit 268 shown in its operative position within the axial bore 284 of the housing 270.

The connector assembly 266 also includes two elastomeric rings 308 and 310 disposed within the axial bore 284 of the housing 270 for providing a fluid tight seal between confronting portions of the conduit 268 and the housing. The elastomeric rings are also separated by a suitable sleeve 312. It should be noted that once the conduit 268 is connected to the housing 270 via the retainer element 272, the conduit may be subsequently released and withdrawn from the axial bore 284 of the housing as follows. By manually deflecting each of the retainer element leg members at a finger portion 314 (extending out of the bore 284 of the housing) inwardly toward the central axis 282 sufficiently to disengage the annular lip 296 of the housing from the outwardly opening channel portion 298 of the leg members, the conduit 268 and the retainer element 272 will be permitted to slide out of the axial bore of the housing. It should be appreciated that the dimensions of the retainer element 272 and the housing 270 relative to the outer diameter of the conduit 268 should be such as to provide sufficient radial clearance between the retainer element and the conduit to permit the deflection of the retainer element leg members necessary for the outwardly opening channel portion 298 to clear the annular lip 296 of the housing. Accordingly, it will be seen that the connector assembly 266 is adapted to readily permit subsequent disconnection of the conduit from the housing. One advantage of this feature of the present invention is that seals may be conveniently replaced without having to replace any of the other components of the connector assembly.

Referring to FIGS. 3 and 4, a front and a side elevation view of a retainer element 316 is shown. Retainer element 316 is similar to the retainer element 272, in that it generally comprises three circumferentially spaced resilient, deformable leg members 318, 320 and 322, extending from an integral collar member 324 at one end thereof. However, as best illustrated in FIG. 4, the retainer element 316 includes an annular flange 326 extending outwardly from the collar member 324 for positioning the sealing element(s) within the axial bore of the connector housing. Since the flange 326 serves a principal function normally provided by a bushing, it should be appreciated that the need for the bushing may be eliminated in the appropriate application.

As may best be illustrated in FIG. 3, in one form of the present invention the leg members 318-320 are equally spaced circumferentially, and the opposing axially extending edges of any two of the leg members from a substantially straight line. For example, edge 328 of leg member 322 and edge 330 of leg member 320 form a horizontally-extending straight line. Thus it may also be noted that any two of the leg members span a maximum of one hundred and eighty degrees (180°) (including the circumferential space between the leg members). It may also be noted that the provision of three leg members provides certain advantages in relation to a retainer element with either two or four leg members. For example, in order to disconnect a conduit from a housing, the finger portions of a three leg retainer element will be easier to grasp than a four leg retainer element. Additionally, a three leg retainer element will provide greater circumferential engagement than a two leg retainer element. Furthermore, with a two leg retainer element, a larger diameter connector housing will be required relative to a three leg retainer element in order to permit the leg members to expand around the annular projection of the conduit.

With respect to the materials from which retainer elements 272 and 316 may be constructed, flexible thermoplastic or metal spring stock which will withstand the temperature and chemical environment expected to be encountered in the application is preferred. For example, typical nylons which are considered to be useful are types 6, 6-6, 6-10, 6-12, 11 and 12. It may also be appropriate to add glass reinforcement up to 30% for increased strength in the particular application.

Referring to FIG. 5, a side elevation view of the tubular conduit 268 of FIG. 1 is shown, partially in cross-section. In particular, the conduit 268 is shown in relation to a set of forming dies 332, 334 and 336, which are used to form or coin the annular projection 274 of the conduit. Briefly, forming dies 332 and 334 clamp the conduit on one side of the projection to be formed, and the forming die 336 slides over or clamps the other side of the conduit. Then, as the forming die 336 is drawn into engagement with the forming dies 332 and 334, the conduit will buckle outwardly and conform itself to the shape of the recesses 338 and 340 provided in the forming dies 332 and 334 respectively. It should be noted that this type of annular projection provides certain manufacturing advantages over previous projections having a sloping or tapered lead-in portion, including the use of higher forming forces and easier tolerances to maintain.

While the above description constitutes the preferred embodiments of the present invention, it will be appreciated that the invention is susceptible to modification, variation and change without departing from the proper scope and fair meaning of the accompanying claims.

I claim:

1. A connector assembly for use in communicating a fluid media, said assembly comprising:
   a conduit;
   a housing;
   a retainer element;
   a sealing element;
   said conduit being generally tubular shaped and including a first axially-extending portion having a relatively smooth cylindrical exterior surface and disposed adjacent a terminal end of said conduit, a second axially-extending portion of enlarged diameter disposed axially outwardly from said first axially-extending portion and adapted for engagement with said retainer element, a third axially-extending portion disposed axially outwardly from said second axially-extending portion and having an outer diameter smaller than the outer diameter of said second axially-extending portion;
   said sealing element being of an annular configuration and disposed in axial registry with said first axially-extending portion of said conduit and having an inner diameter sealingly engaged with the exterior surface thereof;
   said housing having an axial bore adapted for receiving at least a portion of said conduit, said bore including a first portion adapted to receive the terminal end of said conduit, a second portion adapted for sealing engagement with the outer diameter of said sealing element, and a third portion adapted to operatively receive said retainer element, said third portion having means defining at least one radially extending surface cooperable with said retainer element for securing the same within said bore and preventing disassembly of said conduit from said housing;
   said retainer element including at least one relatively deformable portion extending substantially parallel to the axis of said conduit, at least one relatively non-axially deformable portion extending between the axially outerside of said second axially-extending portion of said conduit and said radially-extending surface of said housing and thereby maintaining said retainer element within said bore and preventing withdrawal of said conduit from said housing, and said relatively deformable portion of said retainer element being sufficiently long and deformable to allow sufficient radial movement of said relatively non-axially deformable portion to permit said non-axially deformable portion to be biased radially outwardly by said second axially-extending portion of said conduit as said conduit is inserted into said bore, and to cause said relatively non-axially deformable portion to snap radially inwardly adjacent the axially outerside of said second axially-extending portion when said conduit is positioned in place within said bore;
   said housing comprising a cylindrical body including said bore at one end thereof and an axial second bore at the opposite end thereof; and
   said conduit communicable with said first mentioned bore and having the terminal end secured adjacent said second axial bore by cooperating radial projecting areas on said housing and said retainer element and said conduit.

2. The assembly as set forth in claim 1, wherein said second portion of said bore has a diameter greater than the diameter of said first portion of said bore.

3. The assembly as set forth in claim 1, wherein said third portion of said bore has a diameter greater than a diameter of said second portion of said bore.

4. A connector assembly for use in communicating a fluid media, said assembly comprising:
   a conduit;
   a housing;
   a retainer element;
   a sealing element;
   said conduit being generally tubular shaped and including a first axially-extending portion having a relatively smooth cylindrical exterior surface and disposed adjacent a terminal end of said conduit, a second axially-extending portion of enlarged diameter disposed axially outwardly from said first axially-extending portion and adapted for engagement with said retainer element, a third axially-extending portion disposed axially outwardly from said second axially-extending portion and having an outer diameter smaller than the outer diameter of said second axially-extending portion;
   said sealing element being of an annular configuration and disposed in axial registry with said first axially-extending portion of said conduit and having an inner diameter sealingly engaged with the exterior surface thereof;
   said housing having an axial bore adapted for receiving at least a portion of said conduit, said bore including a first portion adapted to receive the terminal end of said conduit, a second portion adapted for sealing engagement with the outer diameter of said sealing element, and a third portion adapted to operatively receive said retainer element, said third portion having means defining at least one radially extending surface cooperable with said retainer element for securing the same within said bore and preventing disassembly of said conduit from said housing;

said retainer element including at least one relatively deformable portion extending substantially parallel to the axis of said conduit, at least one relatively non-axially deformable portion extending between the axially outerside of said second axially-extending portion of said conduit and said radially-extending surface of said housing and thereby maintaining said retainer element within said bore and preventing withdrawal of said conduit from said housing, and said relatively deformable portion of said retainer element being sufficiently long and deformable to allow sufficient radial movement of said relatively non-axially deformable portion to permit said non-axially deformable portion to be biased radially outwardly by said second axially-extending portion of said conduit as said conduit is inserted into said bore, and to cause said relatively non-axially deformable portion to snap radially inwardly adjacent the axially outerside of said second axially-extending portion when said conduit is positioned in place within said bore;

said housing comprising a cylindrical body including said bore at one end thereof and an axial second bore at the opposite end thereof; and said conduit communicable with said first mentioned bore and having the terminal end secured adjacent said second axial bore by cooperating radial projecting areas on said housing and said retainer element and said conduit, wherein said second portion of said bore has a diameter greater than the diameter of said first portion of said bore and said third portion of said bore has a diameter greater than the diameter of said second portion of said bore.

* * * * *